United States Patent Office 2,857,346
Patented Oct. 21, 1958

2,857,346

SYNTHETIC RESIN TANNING AGENTS CONTAINING ALKALI PRETREATED SULFITE WASTE LIQUOR AND PROCESS OF PREPARING SAME

Gustav Mauthe, Opladen, and Rudolf Fingado, Leverkusen, Germany, assignors to Farbenfabriken Bayer Aktiengesellschaft, Leverkusen, Germany, a corporation of Germany No Drawing. Application January 21, 1955
Serial No. 483,433

Claims priority, application Germany January 26, 1954

16 Claims. (Cl. 260—17.5)

The present invention relates to condensation products which are useful as synthetic tanning agents and to a process of producing same; more particularly the invention concerns a process of producing synthetic tanning agents in the form of soluble, solid resins.

Numerous compounds known as synthetic tanning agents are condensation products of aromatic sulfonic acids with aromatic hydroxy compounds and aldehydes, or more or less incompletely sulfonated condensation products of aromatic hydroxy compounds with aldehydes. As examples of such condensation products there may be mentioned the products obtained from the sulfonation of β-naphthol and from aromatic hydroxy compounds with formaldehyde, according to German Letters Patent No. 860,061, or those from hydrocarbon sulfonic acids with polyvalent aromatic hydroxy compounds and formaldehyde according to German Letters Patent No. 870,268. Synthetic tanning agents which are incompletely sulfonated condensation products of aromatic hydroxy compounds can be obtained according to German Letters Patent No. 693,923.

The synthetic tannings agents thus obtained can be recovered by stirring their solutions with appropriate amounts of mineral acid and a salt of a mineral acid such as ammonium sulfate, or common salt or mixtures thereof. Depending on the nature of tanning agent either soft resins, which on account of their strong tackiness cannot be kneaded to separate the excess of salting-out liquor, or kneadable resins result which are, however, very dark in color and show a considerable deterioration in their tanning effect compared with the corresponding syrupy tanning agents. Moreover, in every salting-out operation 10-20 percent of the pure tanning matter are lost with the salting-out liquor. The types of synthetic tanning agent mentioned above are mixtures, the individual components of which differ greatly from one another in particle size and in the degree of sulfonation, and the low molecular weight or highly sulfonated portions are not recovered by the salting-out process.

An object of the present invention is to provide a new process for the production of condensation products useful as tanning agents.

Another object of the invention is to provide an efficient and economic process for the production of solid, light-colored, soluble condensation products which are excellently suitable as tannings agents.

A further object of the invention is to provide solid, light colored, soluble condensation products with excellent tanning properties.

Further objects will become apparent as the following description proceeds.

These objects are attained by using alkali-pretreated sulfite waste liquor in the salting-out process of the aforesaid synthetic tanning agents.

In accordance with the present invention it has now been found that condensation products of sulfonic acids or aromatic compounds containing sulfomethyl groups with aromatic hydroxy compounds and aldehydes, or more or less incompletely sulfonated or sulfomethylated condensation products of aromatic hydroxy compounds with aldehyde together with alkali-pretreated sulfite waste liquor with or without the addition of small amounts of a hydroxyaryl formaldehyde resin, condensed in acid medium, can be precipitated by means of mineral acid and an alkali metal salt or an ammonium salt of a mineral acid in the form of solid, light colored kneadable, soluble resins.

It is a surprising feature of the invention that the resin mixture obtained according to the herein described process will tan animal hide in an outstanding manner although it is known that the tanning effect of salted-out alkali-pretreated sulfite waste liquor is poor.

It has further been found that the liquor employed for the salting-out operation contains only 3-5 percent of the pure tanning matter applied after recovery of the tanning resin. This shows that the low molecular weight or highly sulfonated portions of the tanning agent are precipitated as well. This effect was not to be expected, because neither the various condensation products nor the alkali-pretreated sulfite waste liquor show such an extensive salting-out capacity. It is the result of a surprising and specific action of the alkali-pretreated sulfite waste liquor on those particles which, but for the addition of this alkali-pretreated sulfite waste liquor, would escape the salting-out process, thus deteriorating the yield to such an extent that up to now it has been practically impossible to obtain the said synthetic tannings agents in a solid form by salting-out. In order to secure satisfactory behaviour during tanning and obtain the well known favorable properties of synthetic tanning agents such as dispersing effect and tanning acceleration, it is essential that the low molecular weight portions, which had been lost in prior methods, are present.

The present invention is further illustrated by the following examples without being restricted thereto; parts being by weight.

Example 1

3,600 parts of β-naphthol are sulfonated with 3,000 parts of sulfuric acid monohydrate at 115° C. and the product obtained is stirred with 1,800 parts of phenol and 1,800 parts of pure cresol and finally with 2,600 parts of water. This mixture is subsequently condensed with 2,900 parts of 30% formaldehyde at 80° C.

Into this condensation mixture are forced 13,200 parts of sulfite waste liquor of 32° Bé., free from lime and iron, which had previously been boiled with 2,000 parts of a 50 percent solution of caustic soda for 3 hours, together with 460 parts of a moist resin, obtained by boiling 360 parts of cresol with 196 parts of 30% formaldehyde in 400 parts of 1.6% sulfuric acid for 6 hours and then drawing off the supernatant acid.

This mixture of condensation product, in alkali pretreated sulfite waste liquor and cresol-formaldehyde resin, is adjusted to pH=3.1 with about 140 parts of 50% sulfuric acid, and the tanning resin is recovered by the addition of 10,000 parts of 40% ammonium sulfate and 3,800 parts of common salt. This resin is separated from the adhering liquor by pressing. 19,400 parts of tanning resin are obtained. The content of pure tanning matter is as follows:

| | Parts |
|---|---|
| Mixed condensation product | 8,500 |
| Alkali-pretreated sulfite waste liquor with cresol-formaldehyde resin | 3,300 |
| | 11,800 |

The 19,400 parts of tanning resin contain 11,500 parts of pure tanning matter.

300 parts of tanning matter were thus lost with the salting-out liquors, i. e., 2.5 percent of the amount of pure tanning matter applied.

Example 2

1,030 parts of dihydroxy-diphenylsulfone are homogeneously mixed with 540 parts of naphthalene, which had been sulfonated with 540 parts of sulfuric acid monohydrate at 165° C. for 3 hours at 120° C., and condensed with 387 parts of 30% formaldehyde at 105° C. for 5–6 hours.

To this condensation mixture are added 2,100 parts of sulfite waste liquor of 32° Bé. which has previously been boiled with 320 parts of a 50 percent solution of caustic soda for 4 hours, and 70 parts of a moist resin, obtained by boiling 55 parts of phenol with 33.5 parts of 30% formaldehyde in 500 parts of 1.3% sulfuric acid for 5 hours, and then drawing off the supernatant acid.

This mixture of condensation product, alkali-pretreated sulfite waste liquor and phenol-formaldehyde resin, is adjusted to pH=3.5 with 50 ml. of 28% aqueous ammonia, and the tanning resin is salted out with 3,100 parts of 40% ammonium sulfate, 400 parts of solid ammonium sulfate and 500 parts of common salt, and the precipitated tanning resin is separated from the adhering liquor by kneading.

3,575 parts of tanning resin are obtained having a content of 64.5 percent of pure tanning matter.

The salting-out liquor contains 2.8 percent of pure tanning matter.

Example 3

740 parts of naphthalene are sulfonated with 740 parts of sulfuric acid monohydrate at 160° C. for 3 hours, the sulfonation mixture is diluted with 166 parts of water, and condensed with 405 parts of 30% formaldehyde at 105° C. for 4–5 hours.

The condensation mixture is diluted with another 200 parts of water and, after the addition of 1,110 parts of crude pyrocatechol, condensed for 4–5 hours at 50° C. with 590 parts of 30% formaldehyde diluted with 590 parts of water.

To this condensation mixture are added 1,650 parts of lime-free sulfite waste liquor of 20° Bé. which has previously been boiled with 160 parts of a 50 percent solution of caustic soda for 4 hours. From this mixture of condensation product and alkali-pretreated sulfite waste liquor, the tanning resin is precipitated with 2,650 parts of 40% ammonium sulfate and 840 parts of common salt at 70° C. After kneading, there are obtained 4,720 parts of tanning resin containing 48.6 percent of pure tanning matter.

The salting-out liquor contains 4.7 percent of pure tanning matter.

Example 4

316 parts of naphthalene are sulfonated with 316 parts of sulfuric acid monohydrate at 160° C. for 3 hours. Into this solution there are allowed to run 156 parts of o-chlorophenol and 213 parts of 30% formaldehyde at 100° C., at the same time. To this mixed condensation product are added 3,350 parts of sulfite waste liquor of 32° Bé. which had been previously heated, with 600 parts of a 50 percent solution of caustic soda, to 100° C. for 5 hours.

This mixture is rendered acid with 690 parts of concentrated hydrochloric acid and the tanning resin precipitated with 3,900 parts of 40% ammonium sulfate.

After kneading, 2,730 parts of tanning resin are obtained containing 59.7 percent of pure tanning matter. The salting-out liquor contains 3.7 percent of pure tanning matter.

Example 5

Into a mixture of 293 parts of naphthalene, and 13 parts of β-naphthol there are allowed to run 321 parts of sulfuric acid monohydrate at about 100° C. within 3 hours; the temperature should not rise above 120° C. The mixture is kept at 120° C. for another 3 hours, subsequently diluted with 137 parts of water and condensed with 111 parts of 30% formaldehyde at 100° C. for 6 hours.

Separately from the foregoing mixture, a mixture of 125 parts of phenol and 125 parts of cresol is condensed with 200 parts of 30% formaldehyde, 70 parts of sodium sulfite and 70 parts of water at 100° C. for 8 hours.

The condensation product of naphthalene sulfonic acid is forced into the condensation product of phenol, cresol and sodium sulfite at about 75° C.

This mixture is stirred with 1.160 parts of lime-free sulfite waste liquor of 32° Bé. which has previously been heated with 350 parts of a 30 percent solution of caustic soda to 105° C. for 7 hours, and the tanning resin is precipitated by the addition of 1,500 parts of a saturated solution of ammonium sulfate and 490 parts of common salt.

By kneading, 2,280 parts of tanning resin are obtained containing 51.5 percent of pure tanning matter.

The salting-out liquor contains 3.6 percent of pure tanning matter.

Example 6

Into the mixture of the condensation product of naphthalene sulfonic acid and the condensation product of phenol, cresol and sodium sulfite, of Example 5, there is introduced by stirring the reaction product of 81 parts of resorcinol and 26.2 parts of commercial aldo-acetaldehyde mixture in 81 parts of water and 6 parts of formic acid which has been reacted at 95–100° C. for 3 hours.

To this mixture of the three condensation products are added 3,950 parts of lime-free sulfite waste liquor of 32° Bé. which has previously been boiled with 700 parts of a 50 percent solution of caustic soda for 6 hours.

Into the homogeneous mixture are stirred 3,400 parts of a saturated ammonium sulfate solution and 1,100 parts of common salt at about 60° C. The precipitated tanning resin is finally thoroughly kneaded. 3,950 parts of tanning resin are obtained containing 49.6 percent of pure tanning matter. The salting-out liquor contains 4.2 percent of pure tanning matter.

We wish it to be understood that the invention is by no means restricted to the specific components given in the examples but that also other aryl sulfonic acids for instance substituted naphthalene sulfonic acids, benzene sulfonic acids, anthracene sulfonic acids, phenanthracene sulfonic acids, or substitution products thereof, as well as sulfomethyl compounds of the aforesaid types, are within the scope of the invention. As aromatic hydroxy compounds useful according to the invention there may be mentioned mono-, di- or tri-hydroxy benzenes or naphthalenes which may be further substituted by alkyl, halogen or sulfo groups. As partially sulfonated condensation products there are suitable quite generally sulfonated compounds of the novolac type.

We claim:

1. A process for producing solid kneadable tanning resins which comprises precipitating a mixture of (1) a member selected from the group consisting of a condensation product of (a) an aromatic sulfonic acid with (b) an aromatic hydroxy compound and (c) an aldehyde, and a condensation product of (a) an aromatic compound containing at least one sulfo-methyl group with (b) an aromatic hydroxy compound and (c) an aldehyde, and (2) an alkali-pretreated sulfite waste liquor by means of a member selected from the group consisting of sulfuric acid, hydrochloric acid, an alkali metal salt of said acids and an ammonium salt of said acids.

2. A process for producing a solid kneadable tanning resin which comprises precipitating a mixture of (1) a member selected from the group consisting of a condensation product of (a) an aromatic sulfonic acid with (b) an aromatic hydroxy compound and (c) an aldehyde and a condensation product of (a) an aromatic compound containing at least one sulfomethyl group with (b) an aromatic hydroxy compound and (c) an aldehyde, (2) an alkali-pretreated sulfite waste liquor and (3) a hydroxy-aryl-formaldehyde resin by means of a member selected from the group consisting of sulfuric acid, hydrochloric acid, an alkali metal salt of said acids and an ammonium salt of said acids.

3. A process for producing solid kneadable tanning resins which comprises precipitating a mixture of (1) a condensation product of (a) a naphthalene sulfonic acid with (b) an aromatic hydroxy compound and (c) an aldehyde and (2) an alkali-pretreated sulfite waste liquor by means of a member selected from the group consisting of sulfuric acid, hydrochloric acid, an alkali metal salt of said acids and an ammonium salt of said acids.

4. A process for producing solid kneadable tanning resins which comprises precipitating a mixture of (1) a condensation product of (a) a naphthalene sulfonic acid with (b) an aromatic hydroxy compound and (c) an aldehyde, (2) an alkali-pretreated sulfite waste liquor and (3) a hydroxyaryl-formaldehyde resin by means of a member selected from the group consisting of sulfuric acid, hydrochloric acid, an alkali metal salt of said acids and an ammonium salt of said acids.

5. A process for producing solid kneadable tanning resins which comprises precipitating a mixture of (1) a condensation product of (a) a naphthalene sulfonic acid with (b) an aromatic hydroxy compound and (c) formaldehyde, and (2) an alkali-pretreated sulfite waste liquor by means of a member selected from the group consisting of sulfuric acid, hydrochloric acid, an alkali metal salt of said acids and an ammonium salt of said acids.

6. A process for producing solid kneadable tanning resins which comprises precipitating a mixture of (1) a condensation product of (a) a naphthalene sulfonic acid with (b) an aromatic hydroxy compound and (c) formaldehyde, (2) an alkali-pretreated sulfite waste liquor and (3) a hydroxyaryl-formaldehyde resin by means of a member selected from the group consisting of sulfuric acid, hydrochloric acid, an alkali metal salt of said acids and an ammonium salt of said acids.

7. A product obtained by precipitating a mixture of (1) a member selected from the group consisting of a condensation product of (a) an aromatic sulfonic acid with (b) an aromatic hydroxy compound and (c) an aldehyde and a condensation product of (a) an aromatic compound containing at least one sulfomethyl group with (b) an aromatic hydroxy compound and (c) an aldehyde, and (2) an alkali-pretreated sulfite waste liquor by means of a member selected from the group consisting of sulfuric acid, hydrochloric acid, an alkali metal salt of said acids and an ammonium salt of said acids.

8. A product obtained by precipitating a mixture of (1) a member selected from the group consisting of a condensation product of (a) an aromatic sulfonic acid with (b) an aromatic hydroxy compound and (c) an aldehyde and a condensation product of (a) an aromatic compound containing at least one sulfomethyl group with (b) an aromatic hydroxy compound and (c) an aldehyde, (2) an alkali-pretreated sulfite waste liquor and (3) a hydroxyaryl-formaldehyde resin by means of a member selected from the group consisting of sulfuric acid, hydrochloric acid, an alkali metal salt of said acids and an ammonium salt of said acids.

9. A product obtained by precipitating a mixture of (1) a condensation product of (a) a naphthalene sulfonic acid with (b) an aromatic hydroxy compound and (c) an aldehyde and (2) an alkali-pretreated sulfite waste liquor by means of a member selected from the group consisting of sulfuric acid, hydrochloric acid, an alkali metal salt of said acid and an ammonium salt of said acids.

10. A product obtained by precipitating a mixture of (1) a condensation product of (a) a naphthalene sulfonic acid with (b) an aromatic hydroxy compound and (c) an aldehyde, (2) an alkali-pretreated sulfite waste liquor and (3) a hydroxyaryl-formaldehyde resin by means of a member selected from the group consisting of sulfuric acid, hydrochloric acid, an alkali metal salt of said acids and an ammonium salt of said acids.

11. A product obtained by precipitating a mixture of (1) a condensation product of (a) a naphthalene sulfonic acid with (b) an aromatic hydroxy compound and (c) formaldehyde and (2) an alkali-pretreated sulfite waste liquor by means of a member selected from the group consisting of sulfuric acid, hydrochloric acid, an alkali metal salt of said acids and an ammonium salt of said acids.

12. A product obtained by precipitating a mixture of (1) a condensation product of (a) a naphthalene sulfonic acid with (b) an aromatic hydroxy compound and (c) formaldehyde, (2) an alkali-pretreated sulfite waste liquor and (3) a hydroxyaryl-formaldehyde resin by means of a member selected from the group consisting of sulfuric acid, hydrochloric acid, an alkali metal salt of said acids and an ammonium salt of said acids.

13. A process for producing solid kneadable tanning resins which comprises precipitating a mixture of (1) a condensation product of (a) a naphthalene compound containing at least one sulfomethyl group with (b) an aromatic hydroxy compound and (c) an aldehyde and (2) an alkali-pretreated sulfite waste liquor by means of a member selected from the group consisting of sulfuric acid, hydrochloric acid, an alkali metal salt of said acids and an ammonium salt of said acids.

14. A process for producing solid kneadable tanning resins which comprises precipitating a mixture of (1) a condensation product of (a) a naphthalene compound containing at least one sulfomethyl group with (b) an aromatic hydroxy compound and (c) an aldehyde, (2) an alkali-pretreated sulfite waste liquor and (3) a hydroxyaryl-formaldehyde resin by means of a member selected from the group consisting of sulfuric acid, hydrochloric acid, an alkali metal salt of said acids and an ammonium salt of said acids.

15. A product obtained by precipitating a mixture of (1) a condensation product of a (a) naphthalene compound containing at least one sulfomethyl group with (b) an aromatic hydroxy compound and (c) an aldehyde and (2) an alkali-pretreated sulfite waste liquor by means of a member selected from the group consisting of sulfuric acid, hydrochloric acid, an alkali metal salt of said acids and an ammonium salt of said acids.

16. A product obtained by precipitating a mixture of (1) a condensation product of (a) a naphthalene compound containing at least one sulfomethyl group with (b) an aromatic hydroxy compound and (c) an aldehyde, (2) an alkali-pretreated sulfite waste liquor and (3) a hydroxyaryl-formaldehyde resin by means of a member selected from the group consisting of sulfuric acid, hydrochloric acid, an alkali metal salt of said acids and an ammonium salt of said acids.

References Cited in the file of this patent

UNITED STATES PATENTS 2,184,622 Mauthe et al. _____ Dec. 26, 1939